(12) United States Patent
Mitchell

(10) Patent No.: US 9,588,730 B2
(45) Date of Patent: Mar. 7, 2017

(54) MOBILE TELE-IMMERSIVE GAMEPLAY

(71) Applicant: Disney Enterprises, Inc., Burbank, CA (US)

(72) Inventor: Kenneth Mitchell, Earlston (GB)

(73) Assignee: Disney Enterprises, Inc., Burbank, CA (US)

( * ) Notice: Subject to any disclaimer, the term of this patent is extended or adjusted under 35 U.S.C. 154(b) by 443 days.

(21) Appl. No.: 13/739,159

(22) Filed: Jan. 11, 2013

(65) Prior Publication Data

US 2014/0198096 A1  Jul. 17, 2014

(51) Int. Cl.
G09G 5/00 (2006.01)
G06F 3/147 (2006.01)
G06T 19/00 (2011.01)
A63F 13/213 (2014.01)

(52) U.S. Cl.
CPC ............ G06F 3/147 (2013.01); A63F 13/213 (2014.09); G06T 19/006 (2013.01); A63F 2300/1087 (2013.01); A63F 2300/69 (2013.01); G09G 2340/125 (2013.01); G09G 2354/00 (2013.01)

(58) Field of Classification Search
CPC ............... A63F 13/213; A63F 2300/69; A63F 2300/1087; G06T 19/006
See application file for complete search history.

(56) References Cited

U.S. PATENT DOCUMENTS

| | | | | |
|---|---|---|---|---|
| 8,502,835 | B1 * | 8/2013 | Meehan | G06T 19/006 345/633 |
| 2004/0239670 | A1 * | 12/2004 | Marks | 345/419 |
| 2008/0316432 | A1 * | 12/2008 | Tejada | G03B 21/2053 353/28 |
| 2012/0086631 | A1 * | 4/2012 | Osman et al. | 345/156 |
| 2012/0092328 | A1 * | 4/2012 | Flaks et al. | 345/419 |
| 2012/0162255 | A1 * | 6/2012 | Ganapathy et al. | 345/633 |
| 2012/0201472 | A1 * | 8/2012 | Blanchflower et al. | 382/224 |

OTHER PUBLICATIONS

Barakonyi et al., Agents That Talk And Hit Back: Animated Agents in Augmented Reality, Proceedings of the Third IEEE and ACM International Symposium on Mixed and Augmented Reality, 2004.*

* cited by examiner

*Primary Examiner* — Charles Tseng
(74) *Attorney, Agent, or Firm* — Patterson + Sheridan, LLP

(57) ABSTRACT

Techniques for displaying a multiuser augmented reality world on a first augmented reality device. Embodiments capture a visual scene for display. The visual scene includes a first user and wherein the visual scene is captured using one or more camera devices. Visual scene data for a second user is received from a second augmented reality device. Embodiments rendering a sequence of frames for display which depict the first user and the second user in an augmented reality world, where the depiction of the first user is based on the captured visual scene, and where the depiction of the second user is based on the received visual scene data.

26 Claims, 7 Drawing Sheets

MOBILE TELE-IMMERSIVE GAMEPLAY

BACKGROUND

Field of the Invention

The present invention generally relates to a human-computer interface and more specifically to techniques for providing a multiuser augmented reality world on an augmented reality device.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user or player uses the controller to send commands or other instructions to the video game system to control a video game or other simulation being played. For example, the controller may be provided with a manipulator (e.g., a joystick) and buttons operated by the user.

Many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

Embodiments provide a method, computer-readable memory, and augmented reality device for displaying a multiuser augmented reality environment. The method, computer-readable memory, and augmented reality device include capturing a visual scene for display. The visual scene includes a first user and is captured using one or more camera devices. The method, computer-readable memory, and augmented reality device also include receiving visual scene data for a second user. Additionally, the method, computer-readable memory, and augmented reality device include rendering a sequence of frames for display. Here, the sequence of frames depict the first user and the second user in the augmented reality environment. Further, the depiction of the first user is based on the captured visual scene, and the depiction of the second user is based on the received visual scene data.

Another embodiment provides a method for displaying a user in an augmented reality environment. The method includes capturing a visual scene for display. The visual scene includes a first user and is captured using one or more camera devices. Additionally, the method includes determining one or more augmentations to apply to the first user in the captured visual scene, based on one or more identifiers associated with the first user. The method also includes rendering a sequence of frames for display. The sequence of frames depict the first user in the augmented reality environment, where the depiction of the first user is altered based on the determined one or more augmentations.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
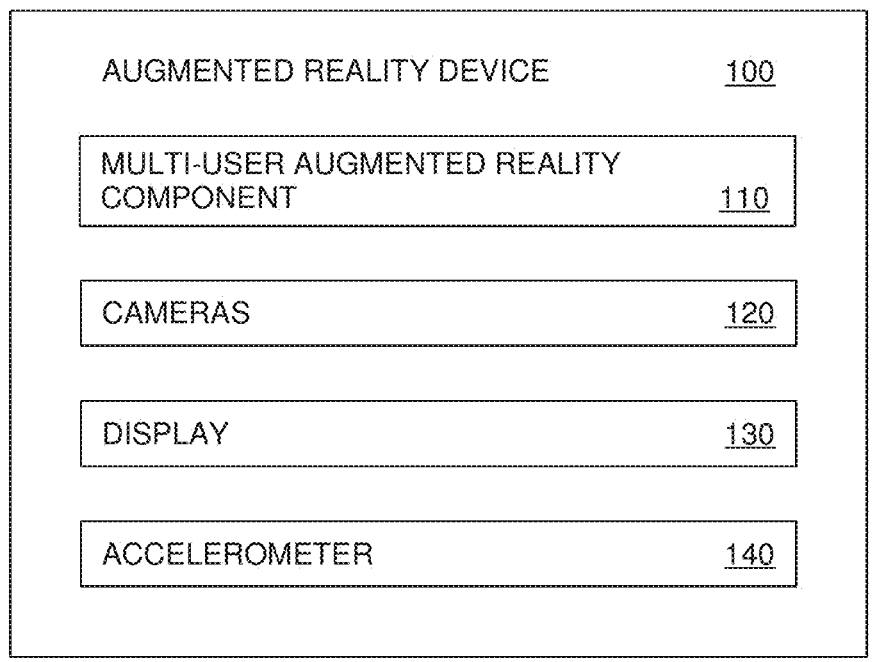
FIG. 1 is a block diagram illustrating an augmented reality device configured with a multi-user augmented reality component, according to one embodiment described herein.

Embodiments provide techniques for displaying a multiuser augmented reality world on a first augmented reality device. As used herein, an augmented reality device refers to any device capable of displaying a real-time view of a physical, real-world environment or elements of a physical, real-world environment, while altering elements within the displayed view of the environment. As such, unlike a virtual reality device which displays a view of virtual world, an augmented reality device displays a view of the real world but augments elements using computer graphics technology. Such an augmented reality device may include a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

Software on the augmented device may capture a visual scene of a physical environment (e.g., using one or more cameras on the augmented reality device). For instance, the software could capture a visual scene that includes a first user. Additionally, the software could receive visual scene data for a second user from a second augmented reality device. Here, the visual scene data could be captured using one or more cameras on or connected to the second augmented reality device. The visual scene data for the second user could be transmitted, for example, across a physical connection between the two augmented reality devices, a wireless connection between the two augmented reality devices (e.g., a Bluetooth connection), or across a network (e.g., the Internet).

The software could then render a sequence of frames for display which depict the first user and the second user in an augmented reality world. For instance, the software could render the depiction of the first user based on the visual scene captured on the augmented reality device, and could render the depiction of the second user based on the visual scene data received from the second augmented reality device. The rendered sequence of frames could then be displayed on one or more display devices connected to the augmented reality device. Advantageously, doing so provides an augmented reality world in which multiple users may exist and interact with one another.

For instance, a visual scene including a first user could be captured using a plurality of camera devices mounted throughout a room and connected to a first augmented reality device, and a second visual scene including a second user could be captured using a second plurality of camera devices mounted throughout a different room connected to a second augmented reality device. The second augmented reality device could transmit the captured second visual scene (or data associated with the second visual scene) to the first augmented reality device. Software on the first augmented reality device could then render a sequence of frames depicting an augmented reality world, containing augmented depictions of the first user and the second user.

As an example, the software could augment the first user and the second user to appear as superheroes wearing superhero costumes. For instance, the first user could appear to be wearing a metal suit of armor in the rendered sequence of frames, while the second user could be shown as wearing a mask. The users could, for example, select which costume they wish to appear in using a menu on the augmented reality device. In one embodiment, various augmented reality costumes may be available for purchase (e.g., in on online store) on the augmented reality device. In a particular embodiment, certain augmented reality costumes may be unlocked by the user performing particular actions or accomplishing particular achievements within the augmented reality world.

In one embodiment, the software could augment the user's appearance based on a physical indicator. For instance, the software could determine the user's appearance, the user's powers, the background scenery, and so on for the augmented reality world based on the physical indicator. For example, the software could be configured to recognize certain clothing garments worn by the user in the captured visual scene and to relate these clothing garments to particular costumes within the augmented reality world. For example, the software could detect that the user is wearing a shirt and pants bearing the logo of a particular super hero, and in response, could render the sequence of frames that depict the user wearing the actual costume of the super hero. As another example, a particular physical item could include a symbol or design that the software on the augmented reality device is configured to recognize (e.g., a QR code). In one embodiment, the symbol or design on the garment is drawn using an infrared ink or another material that is invisible or difficult to see using the human eye. For instance, in such an embodiment, the augmented reality device could be configured with an infrared camera capable of detecting the infrared material. Upon identifying the symbol, the software could render a sequence of frames depicting the user associated with the symbol (e.g., a user wearing a t-shirt on which the symbol appears) as wearing a costume corresponding to the symbol.

In a particular embodiment, software on the augmented reality device is configured to recognize a signal received from a transmitter as the physical indicator. For instance, a user could wear a bracelet configured with a radio frequency (RF) transmitter that broadcasts a signal encoded with data and the augmented reality device could be configured with a receiver (or transceiver) capable of receiving such a signal. In this example, each bracelet could be configured to transmit a signal encoded with a preconfigured costume identifier (ID) value, and the augmented reality device could be configured to map various costume ID values to corresponding superhero costumes. Upon detecting that a particular user viewed using the augmented reality device is wearing a bracelet associated with a particular costume ID value, the augmented reality device could determine which superhero costume corresponds to the particular costume ID value and could render a sequence of frames depicting the particular user as wearing the determined superhero costume.

Additionally, the software could augment a user's appearance to depict the user as having superhero powers. For example, the rendered sequence of frames could depict the first user as flying through the air. As another example, rendered sequence of frames could depict the second user as firing laser beams from his eyes. In a particular embodiment, the software is configured to detect when a user performs a particular predefined gesture and to render the user as having a particular super power that corresponding to the predefined gesture. For example, the software could be configured to recognize a predefined gesture of a user putting both of his hands straight out in front of his chest, and could be further configured to associate this gesture with an energy beam superpower. Upon detecting that the user has performed the predefined gesture, the software could render a sequence of frames depicting the user as firing an energy beam from his arms.

The software on the augmented reality device could also render the sequence of frames to depict the users within a virtual background environment. For example, the rendered frames could depict the first user and the second user on top of a skyscraper. Additionally, the users could navigate around the virtual environment by performing various predefined gestures. As an example, the software could be configured to recognize a predefined gesture of the user squatting down and then standing up straight, and to associate such a gesture with a super jump power in the augmented reality world. Continuing such an example, the users could explore the depicted virtual environment by performing the squat gesture to jump from rooftop to rooftop in the augmented reality world.

In addition to augmenting the appearance of objects and/or users within the augmented reality environment, embodiments can be configured to augment captured audio as well. For instance, in an embodiment where a first user's appearance is altered in the augmented reality environment, such that the first user appears to be wearing a particular superhero's costume, the first user's voice could also be altered in the augmented reality environment such that the first user sounds like the particular superhero when he or she speaks. As an example, the particular superhero could be renowned for having a very low, gruff voice, while the user could be a young child with a relatively high pitched voice. When the user speaks, embodiments could capture the speech (e.g., using a microphone(s)) and could apply one or more augmentations to the captured audio, such that the altered speech sounds as if the user is speaking with the superhero's low, gruff voice. This altered speech could then be played for the second user. Advantageously, doing so provides a more immersive augmented reality environment, in which the first user is augmented to not only visually resemble the superhero, but also is able to speak using the superhero's voice. Of course, such an example is without limitation and is provided for illustrative purposes only. More generally, it is broadly contemplated that any audio augmentation(s) can be used, in accordance with the functionality described herein.

FIG. 1 is a block diagram illustrating an augmented reality device configured with a display correction component, according to one embodiment of the present invention. As shown, the augmented reality device 100 includes a multi-user augmented reality component 110, camera devices 120, a display device 130 and an accelerometer 140. The camera devices 120 may include cameras for capturing a visual scene. As used herein, a visual scene refers to a view(s) of the real-world environment in which the device 100 is being used. For instance, a visual scene may be a series of images of a real-world environment. The camera devices 120 may also include one or more user-facing cameras. The multi-user augmented reality component 110 could use such a user-facing camera device 120 to, e.g., determine an angle at which the user is viewing the display device 130. Additionally, the camera devices 120 may include one or more cameras that are not physically present within the augmented reality device 100, but are communicatively coupled to the device 100. For example, the camera devices 120 could be mounted throughout the physical environment and could be positioned such that the cameras 120 capture the user's image from a variety of different angles. Such images could then be used, for instance, to accurately render a depiction of the user within the augmented reality world from various perspectives (e.g., depicting the user in the third person).

Generally, the accelerometer 140 is a device capable of measuring the physical (or proper) acceleration of the augmented reality device 100. The multi-user augmented reality component 110 could use the accelerometer 140, for instance, to track the user's movements in order to, e.g., determine when the user is performing a predefined gesture. The multi-user augmented reality component 110 may also use the accelerometer 140 to, e.g., determine when the position of the augmented reality device 100 is changing, which could indicate the user's viewing angle of the display device 130 is also changing. Although not shown, the augmented reality device 100 could also contain a RF receiver or RF transceiver capable of receiving (and, in the case of a transceiver, transmitting) RF signals.

Generally, the multi-user augmented reality component 110 is configured to display a multiuser augmented reality world on a first augmented reality device. The multi-user augmented reality component 110 may capture a visual scene including a first user for display using the camera devices 120. For example, the camera devices 120 could be positioned throughout a room and could capture images of the first user from various different perspectives.

Additionally, the multi-user augmented reality component 110 could receive visual scene data for a second user from a second augmented reality device. Generally, the visual scene data represents data characterizing a visual appearance of a second user. For instance, the visual scene data could include an image (or multiple images from different perspectives) of the second user captured using a camera device on a second augmented reality device. As another example, the visual scene data could include a three-dimensional (3D) representation of the second user. For instance, the second augmented reality device could be configured to capture a plurality of images of the second user from different perspectives using a plurality of camera devices, and to generate a 3D representation of the second user based on the plurality of images.

Additionally, the visual scene data may include other information, such as an indication of a predefined gesture being performed by the second user or an action corresponding to such a predefined gesture. For instance, in an embodiment where a particular predefined gesture is mapped to a super-jump power, the visual scene data could specify that the second user has performed the particular predefined gesture and/or has activated the super-jump power. The visual scene data could also contain information specifying a costume associated with the second user. For example, the second user could select a costume for his augmented appearance within the augmented reality world using an interface on the augmented reality device. As another example, the second user could wear a particular garment containing a physical indicator associated with a particular costume (e.g., a shirt with a QR code embedded using an infrared ink, a bracelet containing a RF transmitter, etc.).

The multi-user augmented reality component 110 could then render a sequence of frames for display which depict the first user and the second user in an augmented reality world, where the depiction of the first user is based on the captured visual scene, and where the depiction of the second user is based on the received visual scene data. For instance, the multi-user augmented reality component 110 could render frames depicting the first user and the second user in the third person perspective within the augmented reality world, where each of the users is augmented to appear in a respective costume. Additionally, as discussed above, the rendered frames could also depict the users within a virtual environment and/or with various other augmentations. For instance, the multi-user augmented reality component 110 could render frames depicting the users standing atop a skyscraper and performing various super powers (e.g., based on predefined gestures).

Figure 2:
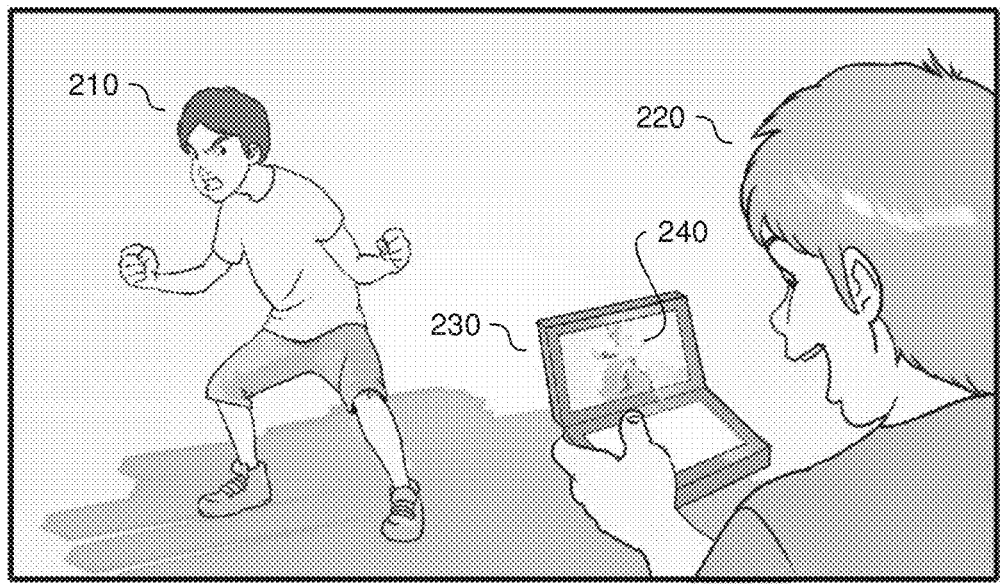
FIG. 2 illustrates users interacting with an augmented reality device, according to one embodiment described herein.

An example of this is shown in FIG. 2, which illustrates users interacting with an augmented reality device, according to one embodiment described herein. As shown, the screenshot 200 depicts a first user 210 and a second user 220. Here, the second user 220 is holding an augmented reality device 230 configured with a multi-user augmented reality component 110, and having a display 240. Here, the display 240 shows a rendered frame in which the appearance of the first user 210 has been augmented.

Figure 3:
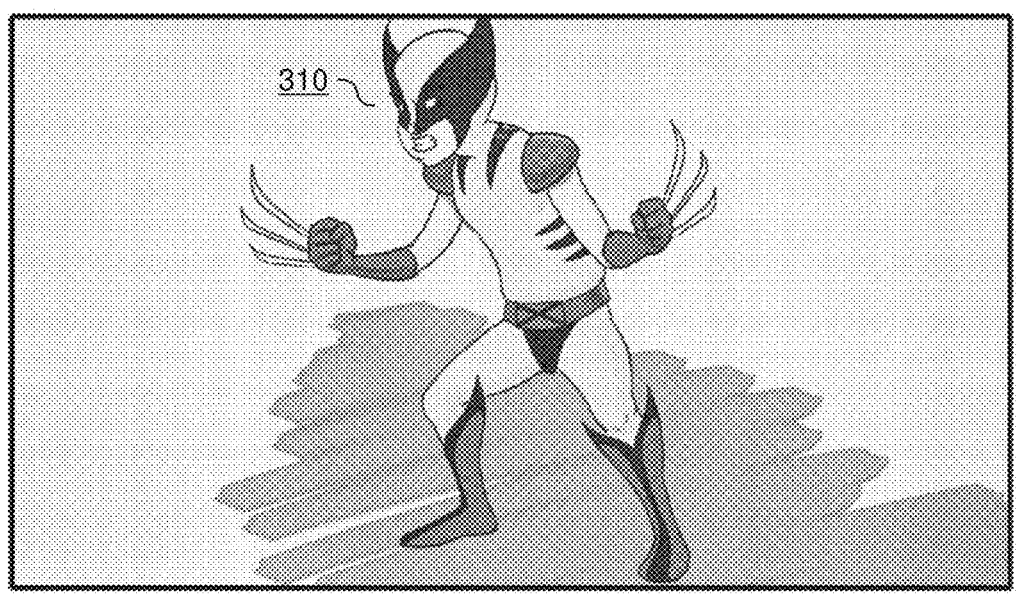
FIG. 3 is a screenshot of a display of the augmented reality device shown in FIG. 2, according to one embodiment described herein.

The rendered frame shown on the display 240 is shown in FIG. 3, which is a screenshot of a display of the augmented reality device shown in FIG. 2, according to one embodiment described herein. Here, the screenshot 300 shows an augmented depiction 310 of the first user 210. As shown, the augmented depiction 310 maintains the same pose as the first user 210, but the first user's appearance has been augmented to show the first user wearing a super hero costume.

As discussed above, the multi-user augmented reality component 110 could determine which costume to use in a variety of different ways. For instance, the multi-user augmented reality component 110 could provide an interface for selecting the costume. For instance, the multi-user augmented reality component 110 could allow a user to select one of a plurality of different costumes, and when the multi-user augmented reality component 110 determines that a captured visual scene (i.e., a scene captured using one or more of the camera devices 120) includes a user, the multi-user augmented reality component 110 could render frames depicting the user wearing the selected costume. In a particular embodiment, the multi-user augmented reality component 110 is configured to associate a particular costume selection with a particular user. For example, the multi-user augmented reality component 110 could be configured to recognize individual users (e.g., using facial recognition techniques) and corresponding costumes for each of the users could be selected (e.g., using an interface of the augmented reality device 100) and stored in a user profile for the user. The multi-user augmented reality component 110 could then determine which user(s) is present within a captured visual scene and could render frames depicting the user(s) wearing the corresponding costume specified in the associated user profile(s).

Additionally, the multi-user augmented reality component 110 could augment the user's appearance based on an indicator in a garment or other object associated with the user. For instance, the multi-user augmented reality component 110 could determine that the user is wearing a shirt with a particular super hero's symbol on it and could render frames depicting the user wearing the particular super hero's costume. In one embodiment, the symbol is embedded on the shirt (or other garment) using a material that is impossible or difficult to see with the human eye (e.g., an infrared ink detectable by an infrared camera on the augmented reality device 100). As another example, the user could have an object (e.g., a bracelet) containing a RF transmitter configured to send a signal embedded with costume ID data identifying a particular costume. In such an example, the multi-user augmented reality component 110 could receive the signal (e.g., using a RF receiver on the augmented reality device 100) and could render frames depicting the user wearing the particular costume corresponding to the received costume ID data.

Figure 4:
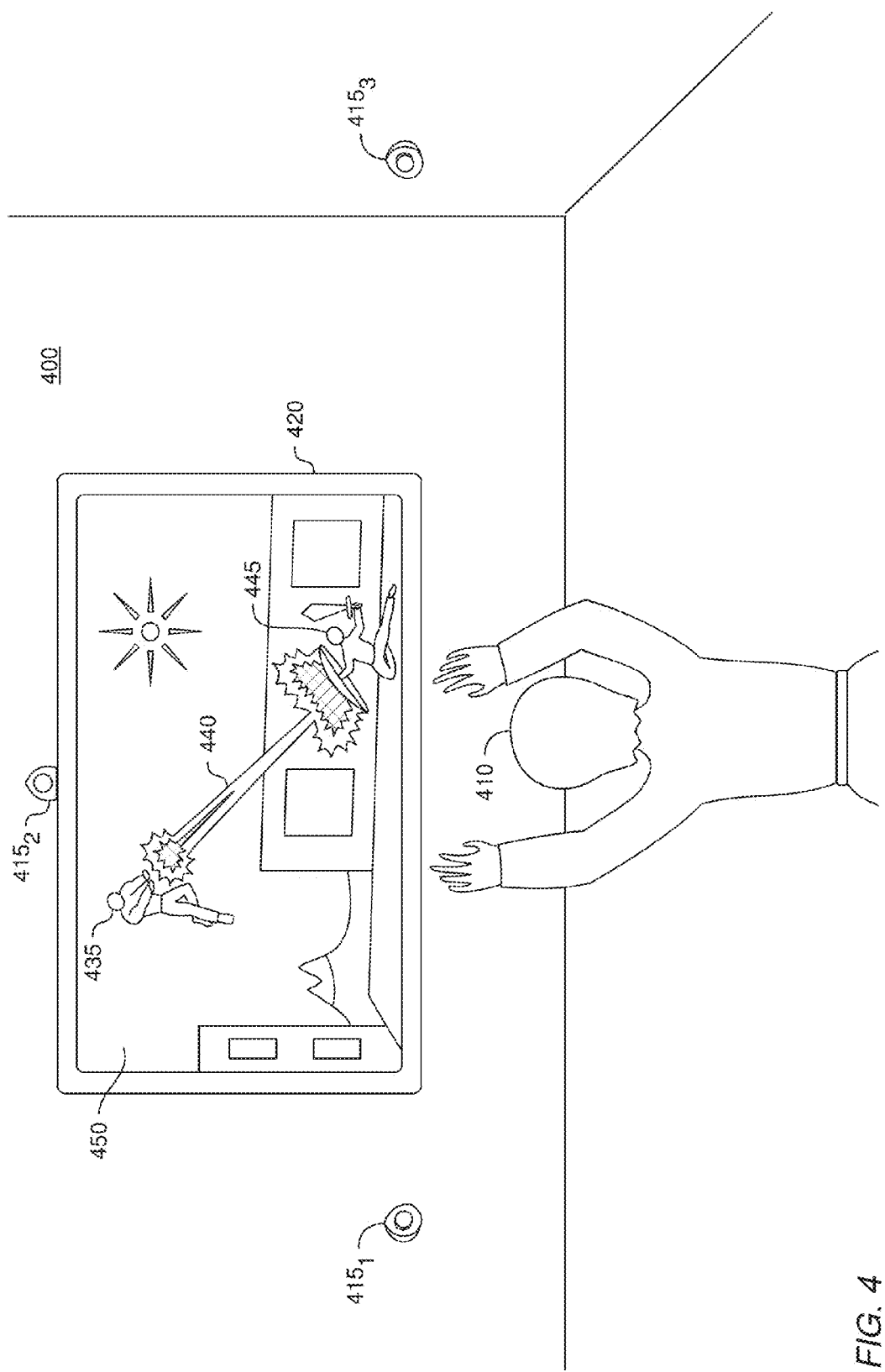
FIG. 4 illustrates a user interacting with an augmented reality device configured with a multi-user augmented reality component, according to one embodiment described herein.

Additionally, the multi-user augmented reality component 110 can be configured to render frames depicting an augmented reality world containing multiple users. An example of this is shown in FIG. 4, which illustrates a first user interacting with an augmented reality device configured with a multi-user augmented reality component, according to one embodiment described herein. As shown, the scene 400 includes a first user 410, a plurality of camera devices 415$_{1-3}$, and a display 420. The display 420 shows an augmented depiction of the first user 410 and augmented depiction of a second user 445, within an augmented environment 450. Here, the first user's 410 appearance has been augmented to show additional muscles as well as the ability to fly within the augmented reality world. Furthermore, the multi-user augmented reality component 110 has determined that the first user is performing a particular predefined gesture and, in response, has rendered frames depicting the first user firing a power blast 440 at the second user's augmented depiction.

In one embodiment, the multi-user augmented reality component 110 is configured to use kinematic sensors and/or motion capture devices in order to detect when a user has performed a predefined gesture. For example, the user could hold a game controller configured with a kinematic sensor(s), and the game controller could transmit movement data describing the user's movements to the augmented reality device. More generally, it is broadly contemplated that any technique, known or unknown, for detecting and/or monitoring user movement can be used, in accordance with the embodiments described herein.

Additionally, the multi-user augmented reality component 110 may be configured to generate a 3D representation of the first user, based on a plurality of images captured using the camera devices 415$_{1-3}$. That is, the cameras 415$_{1-3}$ may be positioned such that the cameras 415$_{1-3}$ capture the first user 410 from different perspectives, and the multi-user augmented reality component 110 could generate a 3D model representation of the user based on these images. The multi-user augmented reality component 110 could then use the 3D representation to depict the first user from different perspectives within the augmented reality world. For instance, in the depicted scene 400, the augmented depiction 435 of the first user 410 is shown with a third person perspective, as is the augmented depiction 445 of the second user. Advantageously, doing so enables the multi-user augmented reality component 110 to render accurate, augmented depictions of the users from a variety of different perspectives, which in turn can provide an improved gaming experience for the users.

Figure 5:
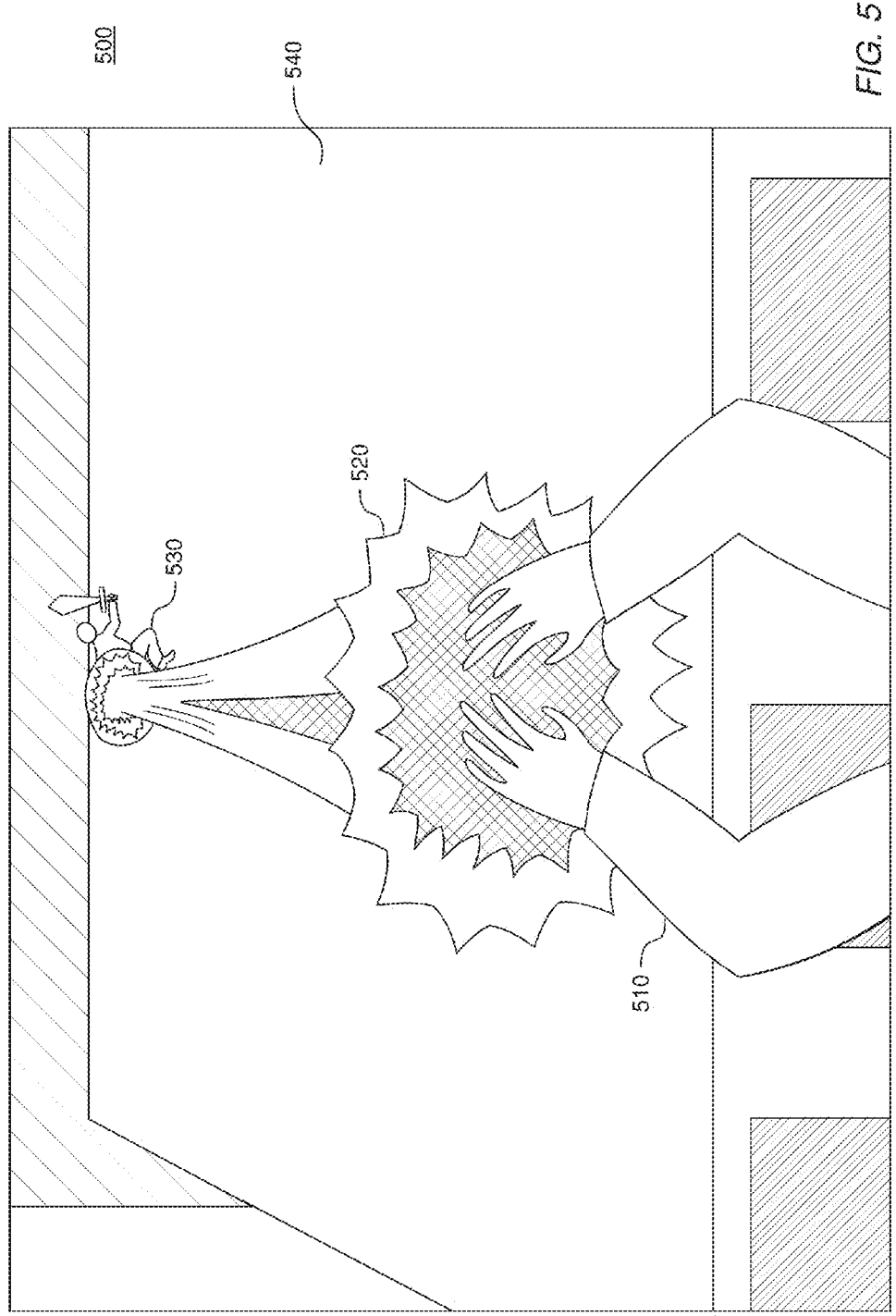
FIG. 5 is a screenshot of an alternate display for the augmented reality device shown in FIG. 4, according to one embodiment described herein.

For instance, the augmented reality world could also be shown from the first person perspective. An example of this is shown in FIG. 5, which is a screenshot of an alternate display for the augmented reality device shown in FIG. 4, according to one embodiment described herein. Here, the screenshot 500 shows the arms 510 of the first user, firing a power blast 520 at an augmented depiction 530 of the second user. Similar to the display 420 of FIG. 4, the users are shown with a background 540 of a skyscraper rooftop. In the depicted example, the first user's arms 510 have been augmented to show the user wearing a particular costume. Additionally, the augmented depiction 530 of the second user could show the second user's face (e.g., based on a 3D representation of the second user generated using a plurality of camera capture images), while augmenting the appearance of the second user to be more muscular, dressed in a particular costume and equipped with a sword and a shield. Advantageously, doing so provides a multi-user experience in which the first user and the second user can interact in an augmented world, while still retaining some of their physical aspects (e.g., their facial appearance, their pose, etc.).

In a particular embodiment, the multi-user augmented reality component 110 is configured to augment the first user's environment by allowing the second user to virtually enter the first user's environment. That is, the first user could see a virtual depiction of the second user within the first user's environment. For example, the virtual depiction of the second user could be shown using a pair of augmented reality glasses worn by the first user. As another example, a projection unit(s) within the first user's environment could generate a projection of the second user within the first user's environment. Likewise, the second user could see himself (e.g., using augmented reality glasses) as present within the first user's environment. Advantageously, doing so provides a more immersive augmented reality experience in which users can virtually travel to another user's physical environment.

Figure 6:
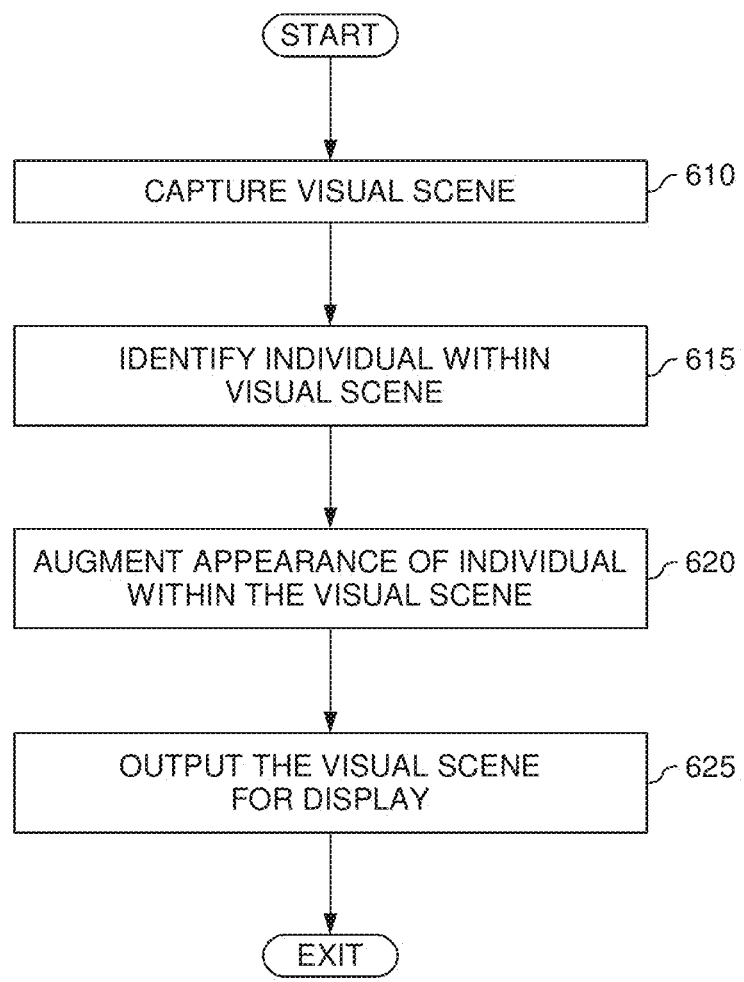
FIG. 6 is a flow diagram illustrating a method for displaying an augmented reality world on an augmented reality device, according to one embodiment described herein.

FIG. 6 is a flow diagram illustrating a method for displaying an augmented reality world on an augmented reality device, according to one embodiment described herein. As shown, the method begins at block 610, where the multi-user augmented reality component 110 captures a visual scene (e.g., using one or more camera devices connected to the augmented reality device 100). The multi-user augmented reality component 110 then identifies an individual within the captured visual scene (block 615). For instance, the multi-user augmented reality component 110 could be preconfigured with geometric information associated with the human form (e.g., size, shape, coloration, etc.) and could use this geometric information to recognize a user(s) within the captured scene. In one embodiment, the multi-user augmented reality component 110 may be preconfigured with facial information for a particular user and could use this facial information to identify a specific user within the visual scene. Such user-specific information could be used, for instance, to identify a user profile corresponding to a user within the scene and for determining how to augment the user's appearance.

The multi-user augmented reality component 110 then renders a sequence of frames in which the identified individual's appearance is augmented (block 620). For example, the multi-user augmented reality component 110 could render frames depicting the user dressed in a particular costume and/or with particular super powers. As discussed above, the multi-user augmented reality component 110 could determine how to augment the individual's appearance in a variety of different ways. For example, the individual could wear a garment (e.g., a t-shirt) embedded with a symbol associated with a particular costume and, upon detecting the embedded symbol, the multi-user augmented reality component 110 could render frames depicting the individual as wearing the corresponding costume. The rendered frames are then output for display (block 625), and the method ends.

Such an embodiment could be used, for instance, to promote a line of clothing associated with a particular super hero movie. Users could then bring their augmented reality devices (e.g., a mobile phone) to the movie theatre and could see other users dressed in this line of clothing as wearing the super hero's costume (e.g., when viewed on the augmented reality device). As another example, a user could wear a bracelet (or carry some other object) configured with a RF transmitter that broadcasts a signal embedded with costume ID data that corresponds to a particular costume. In one embodiment, a mobile device (e.g., a cell phone) is configured with software that locally broadcasts costume ID data. Upon receiving the costume ID data, the multi-user augmented reality component 110 could render frames depicting the user as wearing the corresponding costume.

Figure 7:
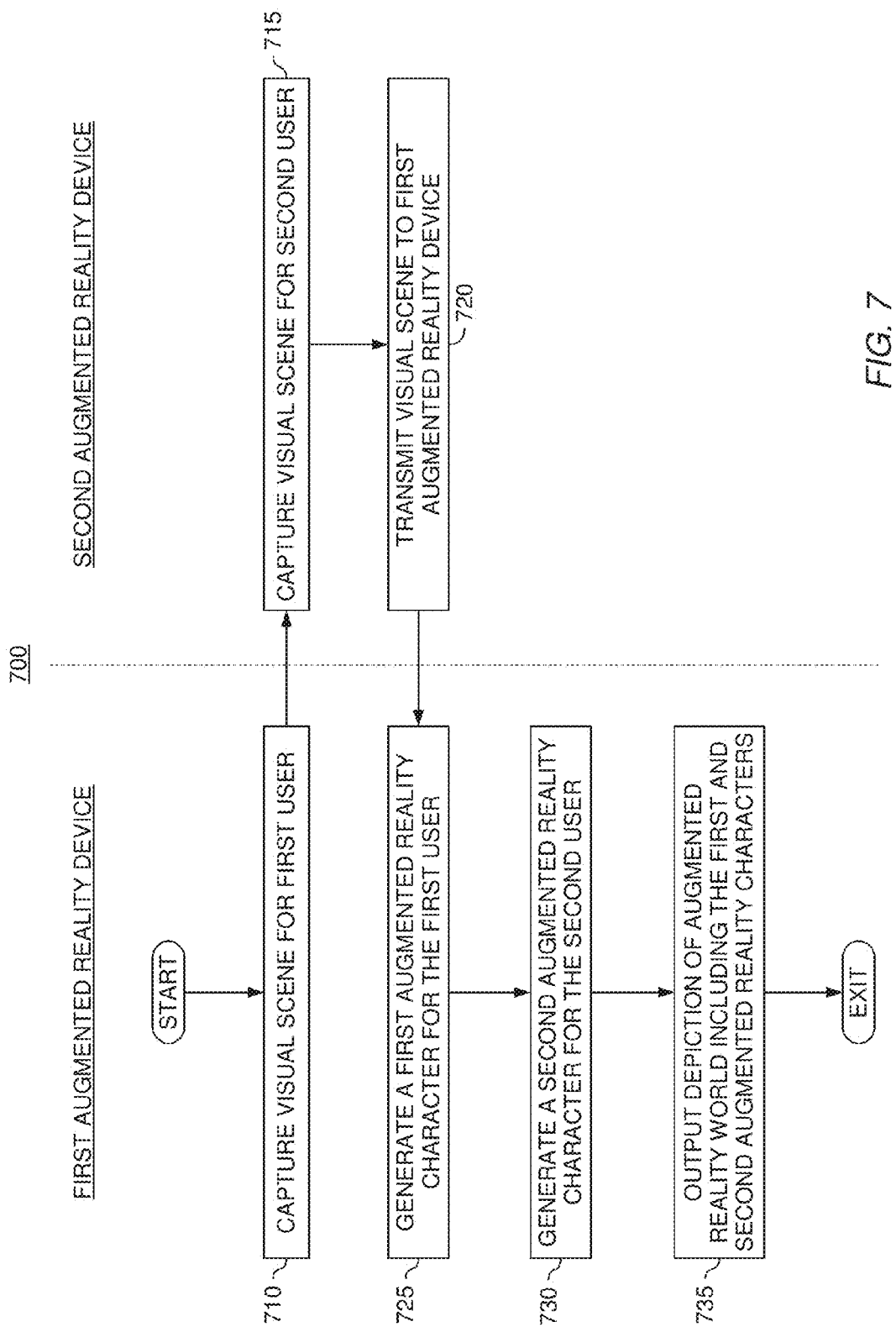
FIG. 7 is a flow diagram illustrating a method for displaying a multi-user augmented reality world on an augmented reality device, according to one embodiment described herein.

FIG. 7 is a flow diagram illustrating a method for displaying a multi-user augmented reality world on an augmented reality device, according to one embodiment described herein. As shown, the method 700 begins at block 710, where the multi-user augmented reality component 110 on a first augmented reality device captures a visual scene for a first user. Additionally, a multi-user augmented reality component 110 on a second augmented reality device captures a visual scene for a second user (block 715), and transmits visual scene data to the first augmented reality device (block 720). In one embodiment, the multi-user augmented reality component 110 on the second augmented reality device is configured to transmit a series of captured images to the first augmented reality device. In another embodiment, the multi-user augmented reality component 110 on the second augmented reality device is configured to generate a 3D representation of the second user and to transmit the 3D representation of the second user and/or associated data to the first augmented reality device.

Additionally, the multi-user augmented reality component 110 on the first augmented reality device generates a first augmented reality character for the first user, based on the captured visual scene for the first user (block 725). For instance, the multi-user augmented reality component 110 could capture images using multiple cameras positioned to capture the first user's appearance from different perspectives, and could generate a 3D representation of the first user using these images. In the depicted embodiment, the multi-user augmented reality component 110 also generates a second augmented reality character for the second user (block 730). In an embodiment where the second augmented reality device transmits a set of images to the first augmented reality device, the multi-user augmented reality component 110 could generate a 3D representation of the second user using these images. However, in another embodiment, the multi-user augmented reality component 110 on the second augmented reality may generate the 3D representation locally and transmit the 3D representation and/or associated data to the first augmented reality device, potentially conserving network bandwidth.

As discussed above, the augmented reality characters for the first user and the second user may be augmented in various ways. For instance, the augmented reality character for the first user could show the first user's face, but the first user's body could be augmented to appear more muscular and wearing a super hero's costume. As another example, the augmented reality character for the second user could show the second user flying through the air while wearing a suit of metal armor and shooting energy beams from his hands. In a particular embodiment, the actions taken by the augmented reality characters are based on predefined gestures performed by the users. For example, continuing this example, the second user could trigger the energy beam super power by putting his hands out in front of him. The multi-user augmented reality component 110 then outputs frames depicting an augmented reality world that includes the first augmented reality character and the second augmented reality character (block 735), and the method 700 ends.

Figure 8:
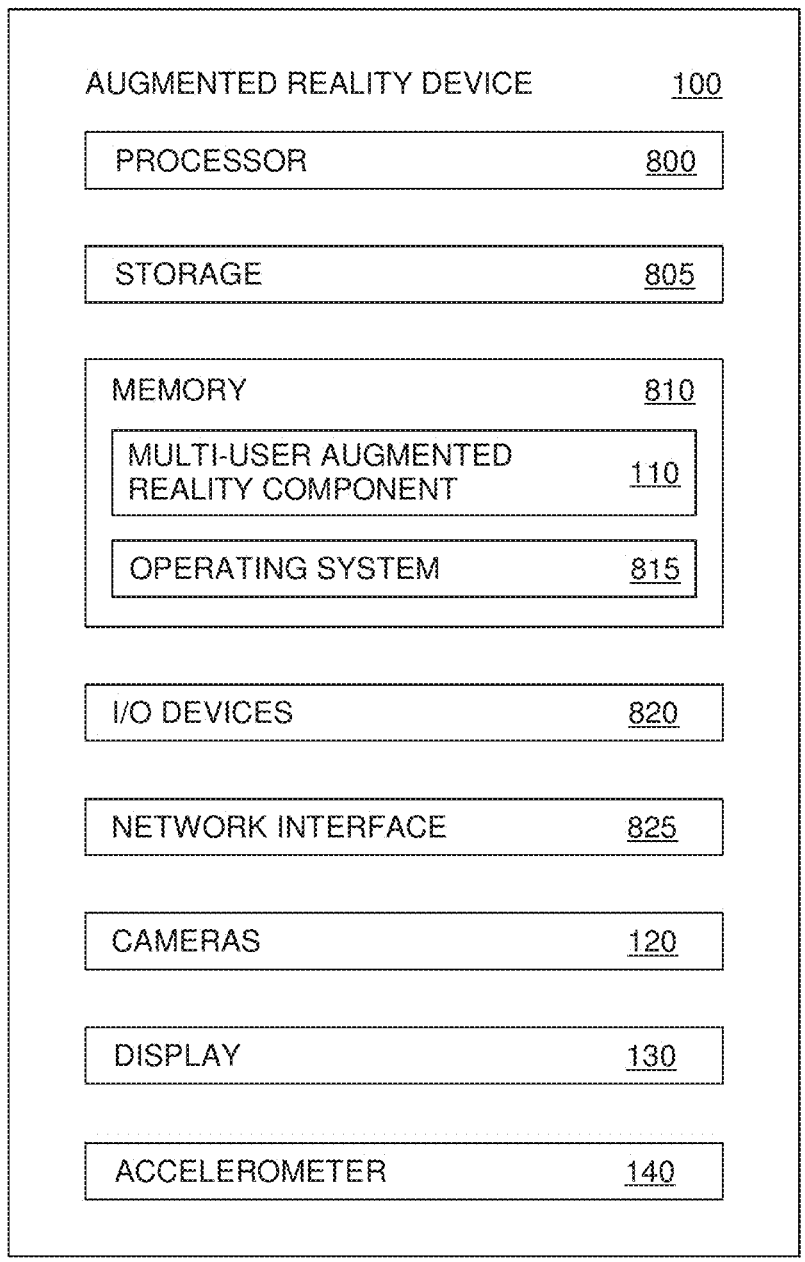
FIG. 8 is a block diagram illustrating an augmented reality device configured with a multi-user augmented reality component, according to one embodiment described herein.

FIG. 8 is a block diagram illustrating an augmented reality device configured with a surface painting component, according to one embodiment described herein. In this example, the augmented reality device 100 includes, without limitation, a processor 800, storage 805, memory 810, I/O devices 820, a network interface 825, camera devices 120, a display devices 130 and an accelerometer device 140. Generally, the processor 800 retrieves and executes programming instructions stored in the memory 810. Processor 800 is included to be representative of a single CPU, multiple CPUs, a single CPU having multiple processing cores, GPUs having multiple execution paths, and the like. The memory 810 is generally included to be representative of a random access memory. The network interface 825 enables the augmented reality device 100 to connect to a data communications network (e.g., wired Ethernet connection or an 802.11 wireless network). Further, while the depicted embodiment illustrates the components of a particular augmented reality device 100, one of ordinary skill in the art will recognize that augmented reality devices may use a variety of different hardware architectures. Moreover, it is explicitly contemplated that embodiments of the invention may be implemented using any device or computer system capable of performing the functions described herein.

The memory 810 represents any memory sufficiently large to hold the necessary programs and data structures. Memory 810 could be one or a combination of memory devices, including Random Access Memory, nonvolatile or backup memory (e.g., programmable or Flash memories, read-only memories, etc.). In addition, memory 810 and storage 805 may be considered to include memory physically located elsewhere; for example, on another computer communicatively coupled to the augmented reality device 100. Illustratively, the memory 810 includes a multi-user augmented reality component 110 and an operating system 815. The operating system 815 generally controls the execution of application programs on the augmented reality device 100. Examples of operating system 815 include UNIX, a version of the Microsoft Windows® operating system, and distributions of the Linux® operating system. (Note: Linux is a trademark of Linus Torvalds in the United States and other countries.) Additional examples of operating system 815 include custom operating systems for gaming consoles, including the custom operating systems for systems such as the Nintendo DS® and Sony PSP®.

The I/O devices 820 represent a wide variety of input and output devices, including displays, keyboards, touch screens, and so on. For instance, the I/O devices 820 may include a display device used to provide a user interface. As an example, the display may provide a touch sensitive surface allowing the user to select different applications and options within an application (e.g., to select an instance of digital media content to view). Additionally, the I/O devices 820 may include a set of buttons, switches or other physical device mechanisms for controlling the augmented reality device 100. For example, the I/O devices 820 could include a set of directional buttons used to control aspects of a video game played using the augmented reality device 100.

The multi-user augmented reality component 110 may generate a view of a multiuser augmented reality world on the augmented reality device 100. For instance, the multi-user augmented reality component 110 may capture a visual scene using one or more of the camera devices 120. Here, the visual scene may include a first user. The multi-user augmented reality component 110 may also receive visual scene data for a second user from a second augmented reality device. For instance, the visual scene data could be captured using one or more camera devices on or connected to the second augmented reality device. The multi-user augmented reality component 110 may then render a sequence of frames for display (e.g., on the display device 130) which depict the first user and the second user in an augmented reality world, where the depiction of the first user is based on the captured visual scene, and where the depiction of the second user is based on the received visual scene data.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access environmental illumination data available in the cloud. For example, a multi-user augmented reality component 110 could execute on an augmented reality device 100 operated by a user and collect environment illumination data pertaining to the user's current environment. In such a case, the multi-user augmented reality component 110 could transmit the collected data to a computing system in the cloud for storage. When the user again returns to same environment, the multi-user augmented reality component 110 could query the computer system in the cloud to retrieve the environmental illumination data and could then use the retrieved data to realistically model lighting effects on objects within an augmented reality scene displayed on the augmented reality device 100. Doing so allows a user to access this information from any device or computer system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of displaying a multiuser augmented reality environment, comprising:
  capturing a visual scene for display, wherein the visual scene includes a first user and wherein the visual scene is captured in a first location using a first plurality of camera devices;
  identifying, in the visual scene, an embedded symbol associated with a garment worn by the first user;
  generating a virtual augmentation corresponding to the first user that is animated based on the captured visual scene, wherein the virtual augmentation comprises:
    selecting a costume, from a plurality of different distinct costumes, without requiring user interaction by the first user; the selected costume having a predefined relationship with the identified embedded symbol; and
    determining a manner in which to alter an appearance of the first user, such that the first user is depicted as wearing the selected costume;
  receiving, over a data communications network, visual scene data for a second user, wherein the received visual scene data is captured in a second location, distinct from the first location, using a second plurality of camera devices;
  transmitting, over the data communications network, data representative of a three-dimensional representation of the first user, based on images captured using the first plurality of camera devices, wherein a remote augmented reality device in the second location is configured to rendering a sequence of frames for display depicting, at least in part, a first augmented reality character corresponding to the first user in the multiuser augmented reality environment;

generating an augmented reality character corresponding to the second user, wherein the augmented reality character is animated based on the received visual scene data; and rendering a sequence of frames for display, wherein the sequence of frames depicts the first user augmented with the virtual augmentation and the augmented reality character corresponding to the second user in the multiuser augmented reality environment, wherein the rendered sequence of frames depict at least a portion of the first user as wearing the selected costume.

2. The method of claim 1, wherein selecting the costume further comprises:
receiving, from an electronic device associated with the first user, a signal that uniquely identifies the selected costume.

3. The method of claim 1, further comprising:
analyzing the visual scene to determine a plurality of edges of the first user within the visual scene; and
identifying the first user within the visual scene, based on the determined plurality of edges.

4. The method of claim 3, wherein an augmented reality device is preconfigured with facial data associated with a first user profile, wherein the first user profile specifies at least one augmentation, and wherein generating the virtual augmentation corresponding to the first user that is animated based on the captured visual scene further comprises:
determining that the identified first user within the visual scene matches the facial data associated with the first user profile; and
augmenting an appearance of the first user within the visual scene, based on the at least one augmentation specified in the first user profile,
wherein the rendered sequence of frames depicts the first user as having the augmented appearance.

5. The method of claim 1, further comprising:
inserting an animated virtual character into the visual scene,
wherein the animated virtual character is configured to interact with the first user and the augmented reality character in the augmented reality environment.

6. The method of claim 1, wherein interactions within the augmented reality world of at least one of the first user and the second user are based on a set of dynamics rules that define dynamics interactions for visual scenes displayed on an augmented reality device.

7. The method of claim 1, further comprising:
detecting the first user has performed a predefined gesture, based on the captured visual scene,
wherein the animation of the virtual augmentation is dynamically determined based on the predefined gesture.

8. The method of claim 1, wherein the visual scene is captured using one or more camera devices of a first augmented reality device, and wherein the received visual scene data for the second user includes one or more visual scene images captured using the second one or more cameras communicatively coupled to a second augmented reality device.

9. A computer-readable storage memory containing a program that, when executed by a processor, performs an operation for displaying a multiuser augmented reality environment, comprising:

capturing a visual scene for display, wherein the visual scene includes a first user and wherein the visual scene is captured in a first location using a first plurality of camera devices;

identifying, in the visual scene, an embedded symbol associated with a garment worn by the first user;

generating a virtual augmentation corresponding to the first user that is animated based on the captured visual scene, wherein the virtual augmentation comprises:
selecting a costume, from a plurality of different distinct costumes, without requiring user interaction by the first user; the selected costume having a predefined relationship with the identified embedded symbol; and
determining a manner in which to alter an appearance of the first user, such that the first user is depicted as wearing the selected costume;

receiving, over a data communications network, visual scene data for a second user, wherein the received visual scene data is captured in a second location, distinct from the first location, using a second plurality of camera devices;

transmitting, over the data communications network, data representative of a three-dimensional representation of the first user, based on images captured using the first plurality of camera devices, wherein a remote augmented reality device in the second location is configured to rendering a sequence of frames for display depicting, at least in part, a first augmented reality character corresponding to the first user in the multiuser augmented reality environment;

generating an augmented reality character corresponding to the second user, wherein the augmented reality character is animated based on the received visual scene data; and rendering a sequence of frames for display, wherein the sequence of frames depicts the first user augmented with the virtual augmentation and the augmented reality character corresponding to the second user in the multiuser augmented reality environment, wherein the rendered sequence of frames depict at least a portion of the first user as wearing the selected costume.

10. The computer-readable storage memory of claim 9, wherein selecting the costume further comprises:
receiving, from an electronic device associated with the first user, a signal that uniquely identifies the selected costume.

11. The computer-readable storage memory of claim 9, the operation further comprising:
analyzing the visual scene to determine a plurality of edges of the first user within the visual scene; and
identifying the first user within the visual scene, based on the determined plurality of edges.

12. The computer-readable storage memory of claim 11, wherein an augmented reality device is preconfigured with facial data associated with a first user profile, wherein the first user profile specifies at least one augmentation, and wherein generating the virtual augmentation corresponding to the first user that is animated based on the captured visual scene further comprises:
determining that the identified first user within the visual scene matches the facial data associated with the first user profile; and
augmenting an appearance of the first user within the visual scene, based on the at least one augmentation specified in the first user profile, wherein the rendered sequence of frames depicts the first user as having the augmented appearance.

13. The computer-readable storage memory of claim 9, the operation further comprising:
   inserting an animated virtual character into the visual scene,
   wherein the animated virtual character is configured to interact with the first user and the augmented reality character in the augmented reality environment.

14. The computer-readable storage memory of claim 9, wherein interactions within the augmented reality world of at least one of the first user and the second user are based on a set of dynamics rules that define dynamics interactions for visual scenes displayed on an augmented reality device.

15. The computer-readable storage memory of claim 9, the operation further comprising:
   detecting the first user has performed a predefined gesture, based on the captured visual scene,
   wherein the animation of the virtual augmentation is dynamically determined based on the predefined gesture.

16. The computer-readable storage memory of claim 9, wherein the visual scene is captured using one or more camera devices of a first augmented reality device, and wherein the received visual scene data for the second user includes one or more visual scene images captured using the second one or more cameras communicatively coupled to a second augmented reality device.

17. An augmented reality device, comprising:
   a processor; and
   a memory containing a program that, when executed on the processor, performs an operation for displaying a multiuser augmented reality environment, comprising:
      capturing a visual scene for display, wherein the visual scene includes a first user and wherein the visual scene is captured in a first location using a first plurality of camera devices;
      identifying, in the visual scene, an embedded symbol associated with a garment worn by the first user;
      generating a virtual augmentation corresponding to the first user that is animated based on the captured visual scene, wherein the virtual augmentation comprises:
         selecting a costume, from a plurality of different distinct costumes, without requiring user interaction by the first user; the selected costume having a predefined relationship with the identified embedded symbol; and
         determining a manner in which to alter an appearance of the first user, such that the first user is depicted as wearing the selected costume;
      receiving, over a data communications network, visual scene data for a second user, wherein the received visual scene data is captured in a second location, distinct from the first location, using a second plurality of camera devices;
      transmitting, over the data communications network, data representative of a three-dimensional representation of the first user, based on images captured using the first plurality of camera devices, wherein a remote augmented reality device in the second location is configured to rendering a sequence of frames for display depicting, at least in part, a first augmented reality character corresponding to the first user in the multiuser augmented reality environment;
      generating an augmented reality character corresponding to the second user, wherein the augmented reality character is animated based on the received visual scene data; and
      rendering a sequence of frames for display, wherein the sequence of frames depicts the first user augmented with the virtual augmentation and the augmented reality character corresponding to the second user in the multiuser augmented reality environment, wherein the rendered sequence of frames depict at least a portion of the first user as wearing the selected costume.

18. The augmented reality device of claim 17, wherein generating the virtual augmentation corresponding to the first user that is animated based on the captured visual scene further comprises:
   augmenting an appearance of the first user within the captured visual scene.

19. The augmented reality device of claim 18, wherein selecting the costume further comprises:
   receiving, from an electronic device associated with the first user, a signal that uniquely identifies the selected costume.

20. The augmented reality device of claim 17, the operation further comprising:
   analyzing the visual scene to determine a plurality of edges of the first user within the visual scene; and
   identifying the first user within the visual scene, based on the determined plurality of edges.

21. The augmented reality device of claim 20, wherein the augmented reality device is preconfigured with facial data associated with a first user profile, wherein the first user profile specifies at least one augmentation, and wherein generating the virtual augmentation corresponding to the first user that is animated based on the captured visual scene further comprises:
   determining that the identified first user within the visual scene matches the facial data associated with the first user profile; and
   augmenting an appearance of the first user within the visual scene, based on the at least one augmentation specified in the first user profile,
   wherein the rendered sequence of frames depicts the first user as having the augmented appearance.

22. The augmented reality device of claim 17, the operation further comprising:
   inserting an animated virtual character into the visual scene,
   wherein the animated virtual character is configured to interact with the first user and the augmented reality character in the augmented reality environment.

23. The augmented reality device of claim 17, wherein interactions within the augmented reality world of at least one of the first user and the second user are based on a set of dynamics rules that define dynamics interactions for visual scenes displayed on the augmented reality device.

24. The augmented reality device of claim 17, the operation further comprising:
   detecting the first user has performed a predefined gesture, based on the captured visual scene,
   wherein the animation of the virtual augmentation is dynamically determined based on the predefined gesture.

25. The augmented reality device of claim 17, wherein the received visual scene data for the second user includes at least one of (i) one or more visual scene images captured using one or more cameras communicatively coupled to the second augmented reality device and (ii) a three-dimensional representation of the second user.

26. A method for displaying a user in an augmented reality environment, comprising:

capturing a visual scene for display, wherein the visual scene includes a first user and wherein the visual scene is captured using a plurality of camera devices;

analyzing the captured visual scene to detect an embedded symbol on an article worn by the first user;

receiving, over a data communications network, visual scene data for a second user, wherein the received visual scene data is captured in a second location, distinct from the first location, using a second plurality of camera devices;

transmitting, over the data communications network, data representative of a three-dimensional representation of the first user, based on images captured using the first plurality of camera devices, wherein a remote augmented reality device in the second location is configured to rendering a sequence of frames for display depicting, at least in part, a first augmented reality character corresponding to the first user in the augmented reality environment;

generating an augmented reality character corresponding to the second user, wherein the augmented reality character is animated based on the received visual scene data;

determining one or more augmentations to apply to the first user in the captured visual scene, based on determining that the embedded symbol has a predefined relationship with a respective one of a plurality of appearance augmentations, comprising:

selecting a costume from a plurality of distinct costumes, without requiring user interaction, based on a signal received from a device associated with the first user, a user profile corresponding to the first user, and a determination that the embedded symbol has a predefined relationship with the respective one of a plurality of appearance augmentations; and rendering a sequence of frames for display, wherein the sequence of frames depict the first user and the augmented reality character corresponding to the second user in the augmented reality environment, wherein the depiction of the first user is altered based on the determined one or more augmentations, such that the first user is depicted within the sequence of frames as wearing the selected costume.

\* \* \* \* \*